(12) United States Patent
Toal et al.

(10) Patent No.: US 12,321,784 B2
(45) Date of Patent: *Jun. 3, 2025

(54) AUTOMATICALLY IDENTIFYING AND RIGHT SIZING INSTANCES

(71) Applicant: Salesforce, Inc., San Francisco, CA (US)

(72) Inventors: Brian Toal, San Francisco, CA (US); Manpreet Singh, Hyderabad (IN)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/657,187

(22) Filed: May 7, 2024

(65) Prior Publication Data
US 2024/0296071 A1    Sep. 5, 2024

Related U.S. Application Data

(63) Continuation of application No. 17/854,652, filed on Jun. 30, 2022, now Pat. No. 12,008,407, which is a continuation of application No. 16/566,209, filed on Sep. 10, 2019, now Pat. No. 11,379,266.

(51) Int. Cl.
    *G06F 9/50*    (2006.01)
(52) U.S. Cl.
    CPC .......... *G06F 9/5027* (2013.01); *G06F 9/5083* (2013.01); *G06F 2209/501* (2013.01); *G06F 2209/5011* (2013.01); *G06F 2209/505* (2013.01)

(58) Field of Classification Search
    CPC ................ G06F 9/5027; G06F 9/5083; G06F 2209/501; G06F 2209/5011; G06F 2209/505; G06F 9/5072
    See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose |
| 5,761,419 A | 6/1998 | Schwartz |
| 5,819,038 A | 10/1998 | Carleton |
| 5,821,937 A | 10/1998 | Tonelli |
| 5,831,610 A | 11/1998 | Tonelli |
| 5,873,096 A | 2/1999 | Lim |
| 5,918,159 A | 6/1999 | Fomukong |
| 5,963,953 A | 10/1999 | Cram |
| 5,983,227 A | 11/1999 | Nazem |

(Continued)

*Primary Examiner* — Benjamin C Wu
(74) *Attorney, Agent, or Firm* — Butzel Long

(57) ABSTRACT

A system is disclosed. The system includes a resource monitor to monitor a resource utilization of a set of resources of one or more instances, the resource utilization corresponding to a first level of performance and cost and an instance type determiner to, based on the resource utilization, determine if there is an instance type for at least one of the one or more instances, with a resource profile, that will provide a second level of performance and cost that is closer to a default level of performance and cost than the first level of performance and cost. In addition, the system also includes an instance type recommender to, based on the determining, perform one of making and not making a recommendation to replace the instance type of the at least one of the one or more instances.

24 Claims, 6 Drawing Sheets

(56) References Cited

U.S. PATENT DOCUMENTS

| | | |
|---|---|---|
| 6,092,083 A | 7/2000 | Brodersen |
| 6,161,149 A | 12/2000 | Achacoso |
| 6,169,534 B1 | 1/2001 | El |
| 6,178,425 B1 | 1/2001 | Brodersen |
| 6,189,011 B1 | 2/2001 | Lim |
| 6,216,133 B1 | 4/2001 | Miasthoff |
| 6,216,135 B1 | 4/2001 | Brodersen |
| 6,233,617 B1 | 5/2001 | Rothwein |
| 6,236,978 B1 | 5/2001 | Tuzhilin |
| 6,266,669 B1 | 7/2001 | Brodersen |
| 6,288,717 B1 | 9/2001 | Dunkle |
| 6,295,530 B1 | 9/2001 | Ritchie |
| 6,324,568 B1 | 11/2001 | Diec |
| 6,324,693 B1 | 11/2001 | Brodersen |
| 6,336,137 B1 | 1/2002 | Lee |
| D454,139 S | 3/2002 | Feldcamp |
| 6,367,077 B1 | 4/2002 | Brodersen |
| 6,393,605 B1 | 5/2002 | Loomans |
| 6,405,220 B1 | 6/2002 | Brodersen |
| 6,411,949 B1 | 6/2002 | Schaffer |
| 6,434,550 B1 | 8/2002 | Warner |
| 6,446,089 B1 | 9/2002 | Brodersen |
| 6,535,909 B1 | 3/2003 | Rust |
| 6,549,908 B1 | 4/2003 | Loomans |
| 6,553,563 B2 | 4/2003 | Ambrose |
| 6,560,461 B1 | 5/2003 | Fomukong |
| 6,574,635 B2 | 6/2003 | Stauber |
| 6,577,726 B1 | 6/2003 | Huang |
| 6,601,087 B1 | 7/2003 | Zhu |
| 6,604,117 B2 | 8/2003 | Lim |
| 6,604,128 B2 | 8/2003 | Diec |
| 6,609,150 B2 | 8/2003 | Lee |
| 6,621,834 B1 | 9/2003 | Scherpbier |
| 6,654,032 B1 | 11/2003 | Zhu |
| 6,665,648 B2 | 12/2003 | Brodersen |
| 6,665,655 B1 | 12/2003 | Warner |
| 6,684,438 B1 | 2/2004 | Brodersen |
| 6,711,565 B1 | 3/2004 | Subramaniam |
| 6,724,399 B1 | 4/2004 | Katchour |
| 6,728,702 B1 | 4/2004 | Subramaniam |
| 6,728,960 B1 | 4/2004 | Loomans |
| 6,732,095 B1 | 5/2004 | Warshavsky |
| 6,732,100 B1 | 5/2004 | Brodersen |
| 6,732,111 B2 | 5/2004 | Brodersen |
| 6,754,681 B2 | 6/2004 | Brodersen |
| 6,763,351 B1 | 7/2004 | Subramaniam |
| 6,763,501 B1 | 7/2004 | Zhu |
| 6,768,904 B2 | 7/2004 | Kim |
| 6,772,229 B1 | 8/2004 | Achacoso |
| 6,782,383 B2 | 8/2004 | Subramaniam |
| 6,804,330 B1 | 10/2004 | Jones |
| 6,826,565 B2 | 11/2004 | Ritchie |
| 6,826,582 B1 | 11/2004 | Chatterjee |
| 6,826,745 B2 | 11/2004 | Coker |
| 6,829,655 B1 | 12/2004 | Huang |
| 6,842,748 B1 | 1/2005 | Warner |
| 6,850,895 B2 | 2/2005 | Brodersen |
| 6,850,949 B2 | 2/2005 | Warner |
| 6,907,566 B1 | 6/2005 | Mlneiro |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | Mineiro |
| 7,181,758 B1 | 2/2007 | Chan |
| 7,269,590 B2 | 9/2007 | Hull |
| 7,289,976 B2 | 10/2007 | Kihneman |
| 7,340,411 B2 | 3/2008 | Cook |
| 7,356,482 B2 | 4/2008 | Frankland |
| 7,373,599 B2 | 5/2008 | Mineiro |
| 7,401,094 B1 | 7/2008 | Kesler |
| 7,406,501 B2 | 7/2008 | Szeto |
| 7,412,455 B2 | 8/2008 | Dillon |
| 7,454,509 B2 | 11/2008 | Veilleux |
| 7,508,789 B2 | 3/2009 | Chan |
| 7,599,935 B2 | 10/2009 | La Rotonda |
| 7,603,331 B2 | 10/2009 | Tuzhilin |
| 7,603,483 B2 | 10/2009 | Psounis |
| 7,620,655 B2 | 11/2009 | Larsson |
| 7,644,122 B2 | 1/2010 | Weyer |
| 7,668,861 B2 | 2/2010 | Doliov |
| 7,698,160 B2 | 4/2010 | Beaven |
| 7,730,478 B2 | 6/2010 | Weissman |
| 7,747,648 B1 | 6/2010 | Kraft |
| 7,779,039 B2 | 8/2010 | Weissman |
| 7,779,475 B2 | 8/2010 | Jakobson |
| 7,827,208 B2 | 11/2010 | Dangelo |
| 7,853,881 B1 | 12/2010 | Aly Assal |
| 7,945,653 B2 | 5/2011 | Zuckerberg |
| 7,996,204 B2 | 8/2011 | Oslake |
| 8,005,896 B2 | 8/2011 | Cheah |
| 8,014,943 B2 | 9/2011 | Jakobson |
| 8,015,495 B2 | 9/2011 | Achacoso |
| 8,032,297 B2 | 10/2011 | Jakobson |
| 8,073,850 B1 | 12/2011 | Steven |
| 8,082,301 B2 | 12/2011 | Ahlgren |
| 8,095,413 B1 | 1/2012 | Beaven |
| 8,095,531 B2 | 1/2012 | Weissman |
| 8,095,594 B2 | 1/2012 | Beaven |
| 8,103,611 B2 | 1/2012 | Tuzhilin |
| 8,150,913 B2 | 4/2012 | Cheah |
| 8,209,308 B2 | 6/2012 | Rueben |
| 8,209,333 B2 | 6/2012 | Hubbard |
| 8,275,836 B2 | 9/2012 | Douglas |
| 8,457,545 B2 | 6/2013 | Chan |
| 8,484,111 B2 | 7/2013 | Sturgeon |
| 8,490,025 B2 | 7/2013 | Jakobson |
| 8,504,945 B2 | 8/2013 | Jakobson |
| 8,510,045 B2 | 8/2013 | Rueben |
| 8,510,664 B2 | 8/2013 | Rueben |
| 8,566,301 B2 | 10/2013 | Rueben |
| 8,646,103 B2 | 2/2014 | Jakobson |
| 9,531,607 B1 | 12/2016 | Pai |
| 9,843,534 B2 | 12/2017 | McFarlin |
| 10,398,056 B1 * | 8/2019 | Bryan ............... B25J 9/1661 |
| 10,402,227 B1 * | 9/2019 | Kinney, Jr. ........... G06F 9/5066 |
| 10,411,960 B1 | 9/2019 | Jones |
| 10,489,170 B2 | 11/2019 | Toal |
| 10,511,481 B1 | 12/2019 | Castellanos |
| 10,614,362 B2 | 4/2020 | Borra |
| 10,747,551 B2 | 8/2020 | Toal |
| 10,802,884 B2 | 10/2020 | Borra |
| 10,802,944 B2 | 10/2020 | Toal |
| 10,803,080 B2 | 10/2020 | Toal |
| 10,810,230 B2 | 10/2020 | Toal |
| 10,817,337 B1 * | 10/2020 | Richardson ........... G06F 9/5005 |
| 10,860,377 B2 | 12/2020 | Toal |
| 10,970,123 B1 | 4/2021 | Luciano |
| 11,138,049 B1 | 10/2021 | Featonby |
| 11,191,181 B1 * | 11/2021 | Tandon ............... B25J 9/1679 |
| 11,314,630 B1 * | 4/2022 | Perumal ............. G06F 11/3688 |
| 11,379,266 B2 * | 7/2022 | Toal ..................... G06F 9/5083 |
| 11,388,835 B1 * | 7/2022 | Bryan ................. H05K 7/1498 |
| 11,715,051 B1 * | 8/2023 | Baskaran ................ G06N 5/04 |
| | | 707/758 |
| 11,977,920 B2 * | 5/2024 | Toal ..................... G06F 9/5072 |
| 11,977,921 B2 * | 5/2024 | Toal ..................... G06F 9/5027 |
| 12,008,407 B2 * | 6/2024 | Toal ..................... G06F 9/5083 |
| 12,008,408 B2 * | 6/2024 | Toal ..................... G06F 9/5083 |
| 2001/0044791 A1 | 11/2001 | Richter |
| 2002/0072951 A1 | 6/2002 | Lee |
| 2002/0082892 A1 | 6/2002 | Raff El |
| 2002/0129352 A1 | 9/2002 | Brodersen |
| 2002/0140731 A1 | 10/2002 | Subramaniam |
| 2002/0143997 A1 | 10/2002 | Huang |
| 2002/0162090 A1 | 10/2002 | Parnell |
| 2002/0165742 A1 | 11/2002 | Robins |
| 2003/0004971 A1 | 1/2003 | Gong |
| 2003/0018705 A1 | 1/2003 | Chen |
| 2003/0018830 A1 | 1/2003 | Chen |
| 2003/0066031 A1 | 4/2003 | Laane |
| 2003/0066032 A1 | 4/2003 | Ramachadran |
| 2003/0069936 A1 | 4/2003 | Warner |
| 2003/0070000 A1 | 4/2003 | Coker |
| 2003/0070004 A1 | 4/2003 | Mukundan |

(56) References Cited

U.S. PATENT DOCUMENTS

| | | | |
|---|---|---|---|
| 2003/0070005 A1 | 4/2003 | Mukundan | |
| 2003/0074418 A1 | 4/2003 | Coker | |
| 2003/0120675 A1 | 6/2003 | Stauber | |
| 2003/0151633 A1 | 8/2003 | George | |
| 2003/0159136 A1 | 8/2003 | Huang | |
| 2003/0187921 A1 | 10/2003 | Diec | |
| 2003/0189600 A1 | 10/2003 | Gune | |
| 2003/0204427 A1 | 10/2003 | Gune | |
| 2003/0206192 A1 | 11/2003 | Chen | |
| 2003/0212643 A1* | 11/2003 | Steele | G06Q 10/087 705/28 |
| 2003/0225730 A1 | 12/2003 | Warner | |
| 2004/0001092 A1 | 1/2004 | Rothwein | |
| 2004/0010489 A1 | 1/2004 | Rio | |
| 2004/0015981 A1 | 1/2004 | Coker | |
| 2004/0027388 A1 | 2/2004 | Berg | |
| 2004/0128001 A1 | 7/2004 | Levin | |
| 2004/0186860 A1 | 9/2004 | Lee | |
| 2004/0193510 A1 | 9/2004 | Catahan | |
| 2004/0199489 A1 | 10/2004 | Barnes-Leon | |
| 2004/0199536 A1 | 10/2004 | Barnes-Leon | |
| 2004/0199543 A1 | 10/2004 | Braud | |
| 2004/0249854 A1 | 12/2004 | Barnes-Leon | |
| 2004/0260534 A1 | 12/2004 | Pak | |
| 2004/0260659 A1 | 12/2004 | Chan | |
| 2004/0268299 A1 | 12/2004 | Lei | |
| 2005/0050555 A1 | 3/2005 | Exley | |
| 2005/0091098 A1 | 4/2005 | Brodersen | |
| 2006/0059492 A1* | 3/2006 | Fellenstein | G06Q 40/04 718/104 |
| 2008/0249972 A1 | 10/2008 | Dillon | |
| 2009/0063415 A1 | 3/2009 | Chatfield | |
| 2009/0100342 A1 | 4/2009 | Jakobson | |
| 2009/0177744 A1 | 7/2009 | Marlow | |
| 2011/0218958 A1 | 9/2011 | Warshavsky | |
| 2011/0247051 A1 | 10/2011 | Bulumulla | |
| 2012/0042218 A1 | 2/2012 | Cinarkaya | |
| 2012/0233137 A1 | 9/2012 | Jakobson | |
| 2012/0290407 A1 | 11/2012 | Hubbard | |
| 2013/0185433 A1 | 7/2013 | Zhu | |
| 2013/0212497 A1 | 8/2013 | Zelenko | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya | |
| 2014/0280946 A1* | 9/2014 | Mukherjee | H04L 67/51 709/226 |
| 2014/0359537 A1 | 12/2014 | Jackobson | |
| 2016/0164738 A1 | 6/2016 | Pinski | |
| 2016/0283139 A1 | 9/2016 | Brooker | |
| 2016/0328273 A1 | 11/2016 | Molka | |
| 2017/0126795 A1 | 5/2017 | Kumar | |
| 2017/0353364 A1* | 12/2017 | Kreiner | H04L 41/5025 |
| 2018/0109610 A1 | 4/2018 | Einkauf | |
| 2018/0324272 A1 | 11/2018 | Toal | |
| 2018/0375795 A1 | 12/2018 | Lee | |
| 2019/0332376 A1 | 10/2019 | Borra | |
| 2020/0106770 A1 | 4/2020 | Surendran | |
| 2020/0118039 A1 | 4/2020 | Kocberber | |
| 2020/0192967 A1 | 6/2020 | Ivanova | |
| 2020/0226156 A1 | 7/2020 | Borra | |
| 2020/0233675 A1 | 7/2020 | Toal | |
| 2020/0310852 A1* | 10/2020 | Featonby | G06F 9/45558 |
| 2020/0310876 A1 | 10/2020 | Featonby | |
| 2020/0326918 A1 | 10/2020 | Venka | |
| 2020/0326957 A1 | 10/2020 | Toal | |
| 2020/0327037 A1 | 10/2020 | Toal | |
| 2020/0341880 A1* | 10/2020 | Sharp | G06F 11/3409 |
| 2020/0356452 A1 | 11/2020 | Shpilyuck | |
| 2021/0160162 A1 | 5/2021 | Abbas | |
| 2021/0224178 A1 | 7/2021 | Singh | |
| 2022/0107733 A1* | 4/2022 | Trika | G06F 3/0607 |
| 2022/0350663 A1 | 11/2022 | Toal | |
| 2022/0350664 A1 | 11/2022 | Toal | |
| 2022/0357993 A1 | 11/2022 | Toal | |
| 2022/0365825 A1 | 11/2022 | Toal | |

* cited by examiner

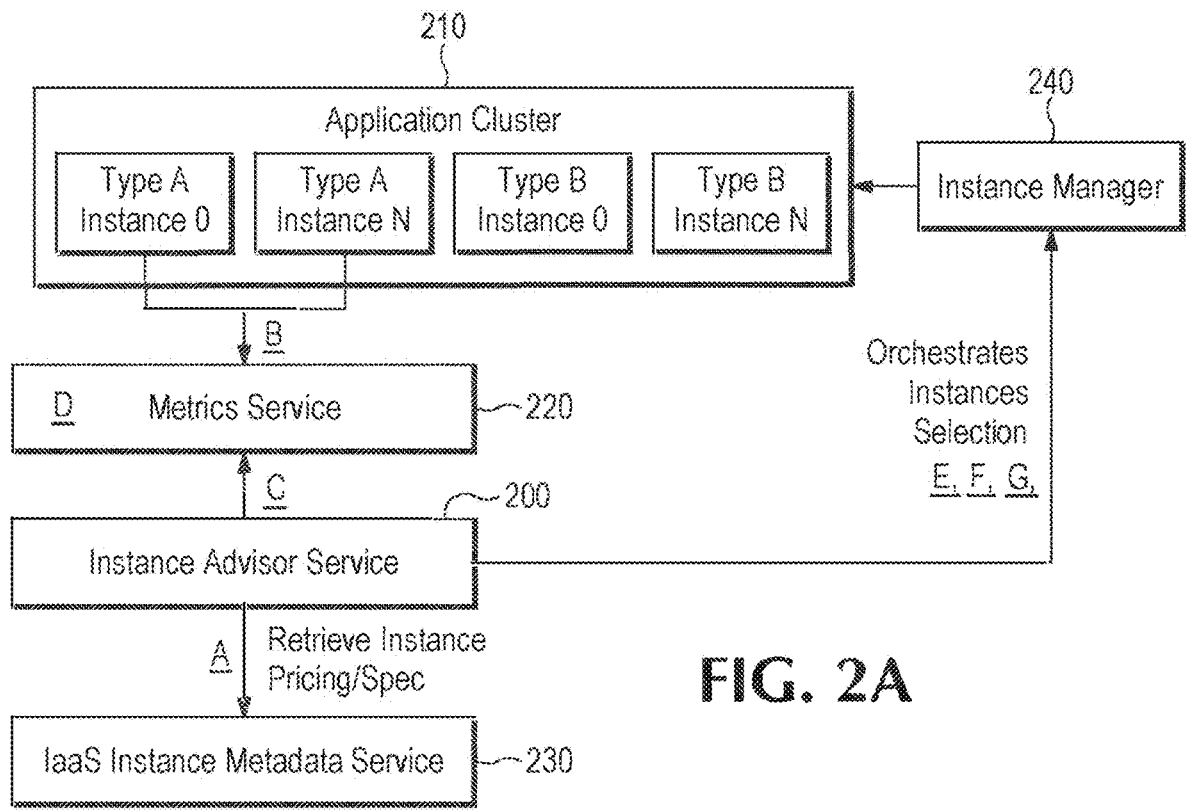
FIG. 2A
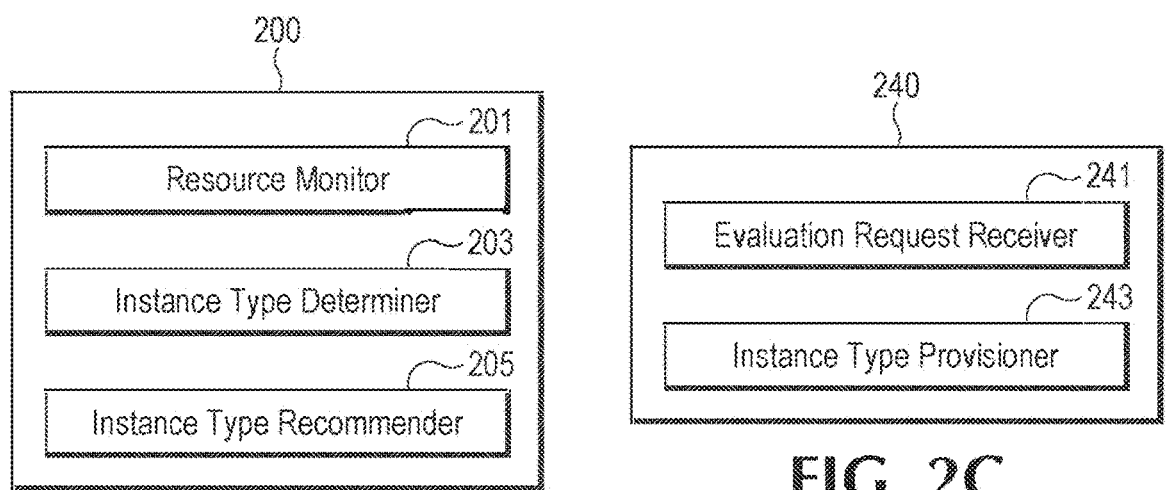
FIG. 2B
FIG. 2C

AUTOMATICALLY IDENTIFYING AND RIGHT SIZING INSTANCES

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to container instances, and more specifically to automatically identifying and right sizing container instances.

BACKGROUND

The material discussed in this background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Infrastructure as a service (IaaS) is a form of cloud computing that provides virtualized computing resources over the internet. In an IaaS model, a cloud provider hosts the infrastructure components traditionally present in an on-premises data center, including servers, storage and networking hardware, as well as the virtualization or hypervisor layer.

The IaaS provider also supplies a range of services to accompany those infrastructure components. The services can be provided by an application that can run across one to many instances of containers. A container is mapped to an instance type.

The underutilization of instances that are provided by an IaaS service in terms of their CPU/Memory/Storage usage can be problematic from a cost perspective. In particular, when an instance is purchased on a per year basis the full cost of the instance must be paid whether usage of the resources associated with the instance is maximized or not.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 2A illustrates the operation of an instance advisory service shown in FIG. 1B according to an embodiment.

FIG. 2B shows components of an instance advisory service according to an embodiment.

FIG. 2C shows components of an instance manager according to an embodiment.

DETAILED DESCRIPTION

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

I. Example System Overview

Figure 1A:
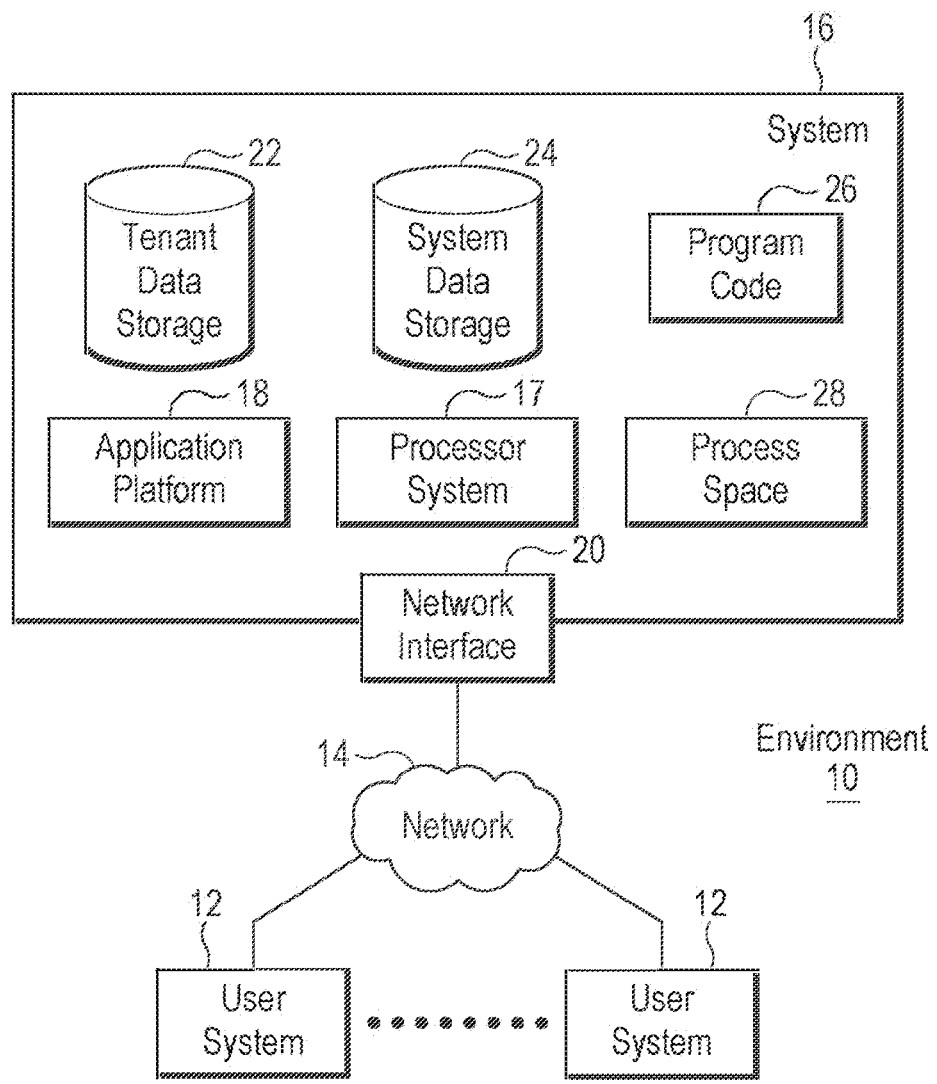
FIG. 1A shows a block diagram of an example environment in which an on-demand database service can be used according to some implementations.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
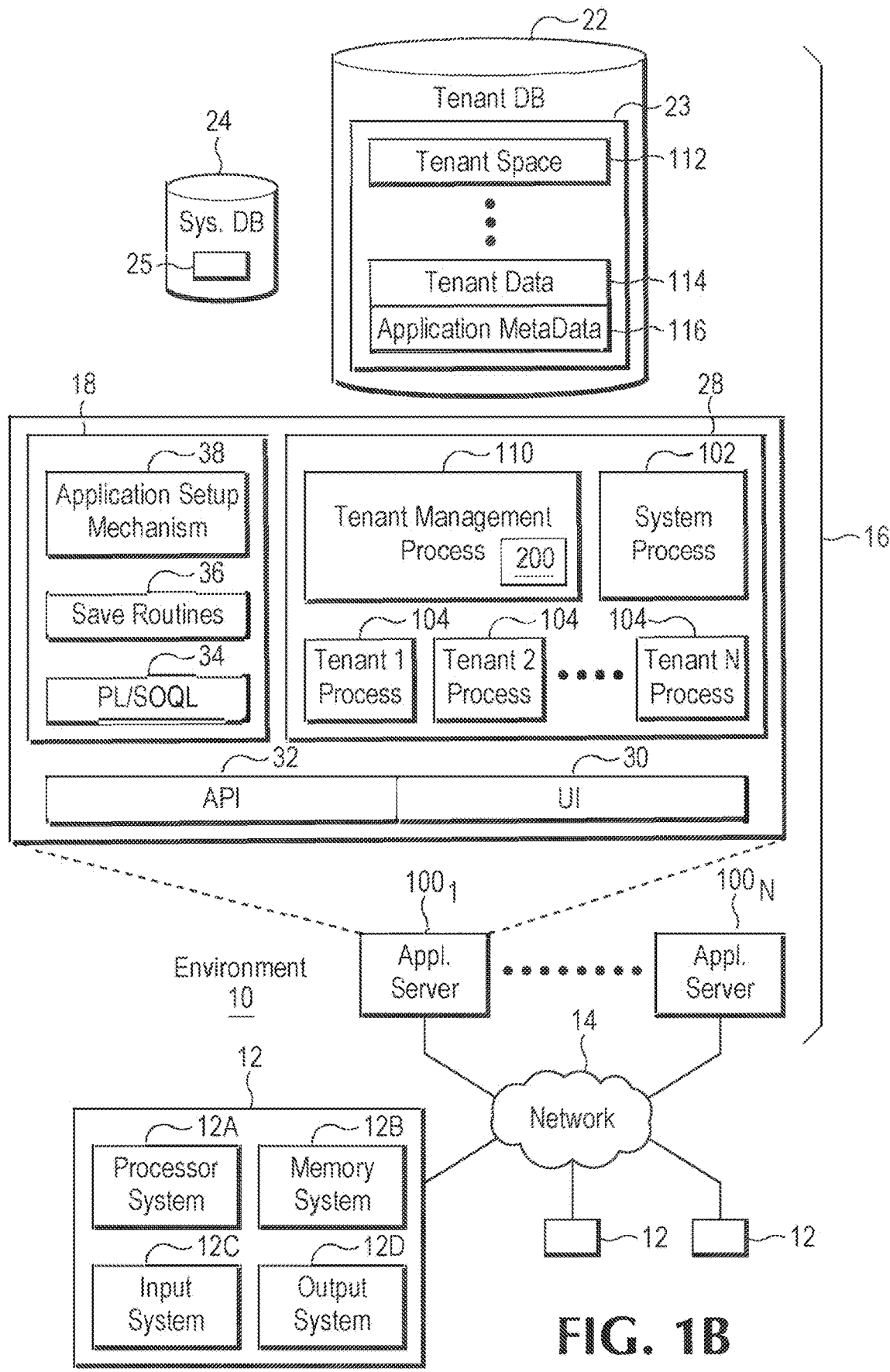
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multitenant physical table, which may contain multiple logical tables per organization. It is transparent to customers that their multiple "tables" are in fact stored in one large table or that their data may be stored in the same table as the data of other customers.

II. Instance Advisory Service

The underutilization of instances that are provided by an IaaS service in terms of their CPU/Memory/Storage usage can be problematic from a cost perspective. In particular, when an instance is purchased on a per year basis the full cost of the instance must be paid whether usage of the resources associated with the instance is maximized or not.

An approach that addresses the shortcomings of such approaches is disclosed and described herein. For example, as part of a disclosed process, in an embodiment, the underutilization of resources can be identified and a more cost-effective instance type found. More specifically, the instance type is automatically resized. In an embodiment, the resulting reduced cost to serve, can be significant if applied over a significant number of machines.

In an embodiment, IaaS space is utilized to monitor/identify/downsize instances. For example, instance usage, in particular, that related to the CPU, memory and storage is monitored. In order to identify whether the instance is eligible for resizing, metrics collected over an extended period of time are compared to a % of the maximum capacity that is available at the different dimensions (CPU/memory/storage). In an embodiment, when a service running on the instance is deemed to have acquired more infrastructure than needed, leading to higher costs, a more appropriate instance can be identified for use. In an embodiment, a rolling restart of the service (e.g., CRM service) can be performed to push the appropriate instance type to production. In an embodiment, the resultant changes in a services workload (optimizations) that reduce resource usage, can be directly reflected in cost savings.

In an embodiment, the tenant management process 110 can include an instance advisory service 200 (see FIG. 1B). In an embodiment, the instance advisory service 200 can monitor the utilization of resources allocated to one or more instances that are part of an application cluster that provides a service, such as a CRM service to a user system 12. In an embodiment, as part of the monitoring, the instance advisory service 200 can determine if there is an instance type with a resource profile, for at least one of the one or more instances that will result in a more optimal level of performance and cost, than does a currently used instance type. In an embodiment, the determination can be based at least in part on resource utilization.

In an embodiment, the instance advisory service 200, can recommend that a current instance type be replaced if an instance type that is available from the IaaS can be identified that will provide a more optimal level of performance as regards a service that is provided. In an embodiment, in addition, the instance advisory service 200 can request an evaluation of the recommended instance type. In an embodiment, the evaluation can be performed as part of a canary experiment. In an embodiment, based on the results of the canary experiment, one or more instances can be replaced or not replaced with a recommended instance type.

As used herein, the performance P of an instance is intended to refer to the proximity of the utilization of its resources to a predetermined baseline or optimal level of resource utilization. In an embodiment, the resources allocated to an instance are provided at a cost C that is based at least in part on the amount of the resources that are allocated.

In an embodiment, a more optimal instance type, is an instance type that results in a level of resource utilization per resource that is closer in terms of actual resource utilization to a predetermined optimal level of resource utilization, than does the current instance type.

In an embodiment, a heuristic can be used to identify an instance type that can achieve a level of performance that falls within an acceptable range of performance levels that are representable as percentages of the baseline level of performance. In an embodiment, such percentages of the baseline level of performance can extend above and below the baseline level of performance P. In an embodiment, the baseline level of performance can have a corresponding cost C. Moreover, in an embodiment, each level of performance P within the acceptable range of performance levels can have a corresponding cost C.

In an embodiment, the baseline or optimal level of performance can be defined before a determination is made regarding whether a more optimal instance type is available. The choice of the baseline level or optimal level of performance can be based on a variety of factors such as but not limited to a desire to accommodate peak resource utilization periods and to minimize underutilization. For example, consider an embodiment, where a baseline or optimal level of performance of 80 percent of the maximum capacity of a resource provided by an instance is selected based on such a consideration. In such an embodiment, resource utilization that falls below 80 percent of the maximum capacity can be detected and the heuristic used to determine if there is a more optimal instance type. In other embodiments, the baseline or optimal level of performance can be other percentages of the maximum capacity.

Operation

FIG. 2A illustrates the operation of the instance advisory service 200 of FIG. 1B. FIG. 2A shows instance advisory service 200, application cluster 210, metrics service 220, instance metadata service 230, and instance manager 240. In FIG. 2A, the operations A-G illustrate the interaction of the instance advisory service 200 with other components as a part of automatically identifying and rightsizing instances.

Referring to FIG. 2A, at A, the instance advisory service 200 queries an IaaS provider's (or other type service provider's) instance type endpoint, such as the instance metadata service 230, in order to maintain a current list of prices per instance type. As examples, as service provider can offer various instance type products that can include features such as but not limited to term length, reservation policy, and so forth. In some examples, instances are separate stacks of hardware and software on which various resources may be operated. It should be noted that instance types can include resources that have different CPU quality (e.g., make/model) and quantity, memory, storage, and networking capabilities. In an embodiment, based on the queries, the instance advisory service 200 can maintain a comprehensive list of the pricing catalog and stock keeping unit (SKU) types.

At B, metrics related to the instance type are streamed to the metrics service 220 from the application cluster 210. In an embodiment, the application cluster 210 includes multiple instances of containers that run an application that provides a service such as a CRM service. In an embodiment, applications typically run across one or more containers. A container is mapped to an instance type. Each resource that is used in the instance type including CPU, memory, storage, and network has a corresponding set of metrics. In an embodiment, the metrics are continuously streamed to the metrics service.

At C, the instance advisory service 200 acquires the metrics related to service that is provided by the application cluster 210 and applies a heuristic to determine based on the workload patterns of the service, characterized by CPU, memory, storage and network usage, if there is a more optimal instance type for one or more instances of the application cluster 210. It should be appreciated that details related to an exemplary heuristic is described with reference to FIG. 2D. In an embodiment, decisions between candidate instance types can be based on tradeoffs between P and C where, for example, among candidate instance types a first candidate may provide the highest performance at a first cost, a second candidate an intermediate performance at a second cost, and a third candidate the lowest performance at a third cost. In an embodiment, performance P and cost C percentages can have a default value, however, a service, e.g., a CRM service, etc., can override the default values based on what is important to the service. In an embodiment, the instance advisory service 200 continuously feeds the metric stream as well as the pricing catalog and performance and cost features into the heuristic, which produces a recommended instance type as an output (see FIG. 2D).

At D, the instance advisory service 200 determines if the recommended instance type is different than one or more of the instance types that the current service, e.g., CRM service, etc., is using. In an embodiment, if the recommended instance type is different than the instance type that the current service is using, the instance advisory service 200 can request that the instance manager 240 run a canary experiment for purposes of evaluating the recommended instance type. In an embodiment, the instance manager 240 can manage any failures and rollbacks related to the canary experiment.

At E, the instance advisory service 200 sends a request to the instance manager 240 to run the canary experiment using the instance type that is recommended. In an embodiment, as part of the request, the instance advisory service 200 provides the instance manager 240 with an identifier of the service (e.g., CRM service or other service being provided) and an identifier of the instance type that is recommended. In response to the request, the instance manager 240 can provision one or more instances of the type that is recommended. In an embodiment, the provisioned instances are then directed to service the work that is fed to the application cluster 210 on a trial basis. In an embodiment, the metrics from the provisioned instances are provided to the metrics service 220. In an embodiment, the instance advisory service 200 can create an experimental entity to track the results of the experiment.

At F, after a predetermined period of time the instance advisory service 200 checks the results of the experiment. In an embodiment, as part of checking the results of the experiment, the instance advisory service 200 queries the experiment records to identify the service and the instance type that is being evaluated. Thereafter, the instance advisory service 200 can access metrics to examine the performance and cost of the proposed instance types, and compare them to the performance and cost of the instance types currently being used. In an embodiment, if the experiment is designed to identify the best performance within a selected range of costs, and results show that an identified best performance is better than the performance of the current instance type, then the current instance type can be replaced. In addition, if the experiment is designed to optimize cost within a selected range of performances, and the identified cost is lower than that of the current instance type, then the current instance type can be replaced. In contrast, if the results show that the optimization goal is not being met, the experiment can be stopped.

At G, the instance advisory service 200 indicates to the instance manager 240 the number of instances of the application cluster 210 that should be migrated (or not migrated) to the recommended instance type, based on the results of the canary experiment. In an embodiment, the indication can be based on the results of a variety of iterations of the canary experiment. In an embodiment, the instance advisory service 200 and the instance manager 240 can continue a canary experiment until either, the entire application cluster 210 is running on the proposed instance type, or the optimization criteria cannot be met.

FIG. 2B shows components of the instance advisory service 200 according to an embodiment. In the FIG. 2B embodiment, the instance advisory service 200 includes resource monitor 201, instance type determiner 203, and instance type recommender 205.

Referring to FIG. 2B, the resource monitor 201 monitors characteristics of resource utilization and cost that are associated with one or more instances that are part of a set of resources and/or part of an application cluster (e.g., application cluster 210 in FIG. 2A). In an embodiment, the resource monitor 201 can monitor workload metrics (e.g., CPU, memory, average page time (APT), etc.), instance pricing specifications, throttling events, and desired performance and cost configurations. Additionally or alternatively, the resource monitor 201 can monitor other types of metrics and metadata.

Instance type determiner 203 determines if there is an instance type with a resource profile, for at least one of the one or more instances that will provide a more optimal level of performance and cost, based at least in part on resource utilization, than does the current instance type. In an embodiment, the instance type determiner 203 applies a heuristic to determine based on the workload patterns of a service (e.g., CRM service or other type service), characterized by CPU, memory, storage and network usage, if there is a more optimal instance type. In an embodiment, decisions between proposed instance types can be based on tradeoffs between P and C where for example among proposed instance types a first proposed instance type may provide the highest performance at a first cost, a second proposed instance type an intermediate performance at a second cost, and a third proposed instance type the lowest performance at a third cost. In an embodiment, performance P and cost C percentages can have a default value, however, services (e.g., CRM services or other type services) can override these default values based on what is important to them.

Instance type recommender 205 recommends an instance type replacement for the at least one of the one or more instances, if an instance type that can provide a more optimal level of performance and cost, is identified that is different from the instance type that the current service (e.g., CRM service or other type service that is being provided) is using. In an embodiment, the instance type recommender 205 can request a canary experiment to be executed for purposes of evaluating the recommended instance type.

FIG. 2C shows components of the instance manager 240 according to an embodiment. In the FIG. 2C embodiment, the instance manager 240 includes evaluation request receiver 241 and instance type provisioner 243.

Referring to FIG. 2C, the evaluation request receiver 241 receives (or otherwise accesses) a request to perform an evaluation of the recommended instance type from instance type recommender 205. In an embodiment, as part of the request, the evaluation request receiver 241 receives or accesses an identifier of the service for which the instance type will be evaluated and an identifier of the instance type that will be evaluated.

The instance type provisioner 243 provisions, as part of an experiment, one or more instances of the recommended instance type to service work associated with an application cluster (e.g., 210 in FIG. 2A). In an embodiment, the instance type provisioner 243 can provision one or more instances of the recommended type as part of a canary experiment. In an embodiment, the metrics from the instances provisioned as part of the canary experiment are provided to the metrics service (e.g., 220 in FIG. 2A).

In an embodiment, an experiment entity can be created (e.g., by instance advisory service 200) to track the results of the canary experiment. For example, in an embodiment, after predetermined periods of time, an experiment entity of the instance advisory service 200 can access the results of the canary experiment. In an embodiment, if the experiment is designed to optimize performance within a selected range of costs, and results show that an instance type identified as providing the best performance provides a performance better than the performance of the current instance type, then the current instance type can be replaced. In addition, if the experiment is designed to optimize cost within a selected range of performances, and the instance type identified provides a cost that is lower than that of the current instance type, then the current instance type can be replaced. However, if the results show that the optimization goal is not being met, the experiment can be stopped.

Figure 2D:
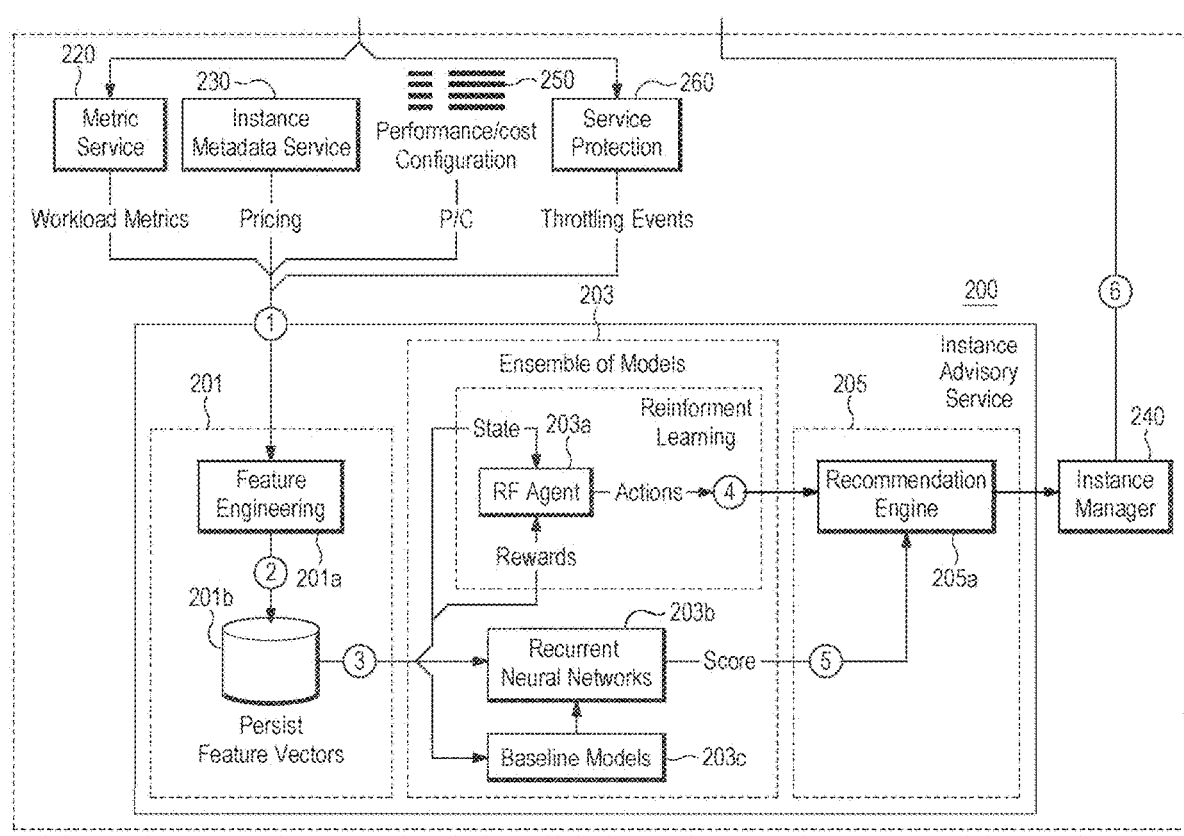
FIG. 2D illustrates an example implementation of the instance advisory service and its interaction with a metric service, an instance metadata service, a service protection service, a performance cost configuration service and an instance manager.

FIG. 2D illustrates an example implementation of the instance advisory service 200 and the interaction of instance advisory service 200 with other components such as metric service 220, instance metadata service 230, instance manager 240, performance cost and configuration service 250, and service protection service 260.

At node 1 in FIG. 2D, resource monitor 201 receives inputs from metrics service 220, instance metadata service 230, performance cost configuration service 250 and service protection service 260. As examples, the inputs to the resource monitor 201 can include but are not limited to workload metrics (e.g., CPU (e.g., processor usage or utilization, processor idle time, host system memory usage, processor time, processor time ratio, processor non-idle wait times, processor power usage or consumption, and/or the like), memory (e.g., memory utilization, memory access wait times, memory response time, storage area network (SAN) input/output (IO) measurements/metrics such as IO operations per second (IOPS)), a size of each IO request size, IO response times and/or IO latency times, IO queue sizes, and/or the like), average page time (APT), number of transactions, number or user requests, average size or user requests, average size of DB queries, number of user responses, average response time, number of requests to access individual resources or tenant data, number of incidents (failures, errors, and the like), and/or the like), instance pricing specification, throttling events, desired performance and cost configurations, and/or other metrics and/or metadata. These inputs are ingested from respective sources 220, 230, and 250. At node 2 in FIG. 2D, the inputs are provided to a feature engineering component 201a of the resource monitor 201. In an embodiment, the received dataset is de-noised, correlated, and vectorized into an expected format and then persisted (e.g., stored) in a datastore 201b of the resource monitor 201.

At node 3 in FIG. 2D, the instance type determiner 203 receives feature vectors from the resource monitor 201. In an embodiment, the feature vectors are processed by an ensemble of machine learning (ML) models of the instance type determiner 203 to understand various workload patterns. In an embodiment, reinforcement learning (RL) models 203a ingest or otherwise receive the current workload state and reward (e.g., P/C configuration), and based on the state and/or rewards, at node 4 recommends an action that is designed to maximize the reward. In an embodiment, the reward is a desired performance (P) and cost (C). Additionally or alternatively, recurrent neural networks (RNNs) 203b ingest or otherwise receive the vectorized data and uses the vectorized data to understand workload patterns. The recurrent neural networks 203b understands or learns the workload patterns by storing the state information and performing predictions. Additionally or alternatively, baseline models 203c provide insights into the regular workload patterns and sets the baseline that RNNs 203b to consume or otherwise use to identify seasonal workload patterns. At node 4 in FIG. 2D, the RL models 203a provide the recommended actions to a recommendation engine 205a of an instance type recommender 205, and at node 5, the RNNs 203b provide the scores (e.g., identifying instance types that are more optimal than currently implemented instance types) as input to the recommendation engine 205a of the instance type recommender 205. The instance type recommender 205 (or recommendation engine 205a) uses this information as generated by the ensemble/weighted techniques of instance type determiner 203 to recommend an instance type to the instance manager 240. At node 6 in FIG. 2D, the instance manager 240 provides a recommended instance type to a user, org, developer, or the like. Additionally or alternatively, the instance manager 240 triggers or otherwise causes a current instance type (e.g., a currently implemented configuration of an instance) to be replaced with a recommended instance type (e.g., a recommended instance configuration for the instance). It should be appreciated that in other embodiments, other implementations of the instance advisory service 200 can be used.

In an embodiment, the instance advisory service 200 continuously collects data related to the current state (e.g., current performance and cost metrics) and desired state (e.g., desired and/or optimal performance and cost states) that are provided to the ensemble of models of instance type determiner 203 which learn and use feedback to recommend scaling options (instance types) to the instance type recommender 205 that can improve both performance and cost.

Figure 3A:
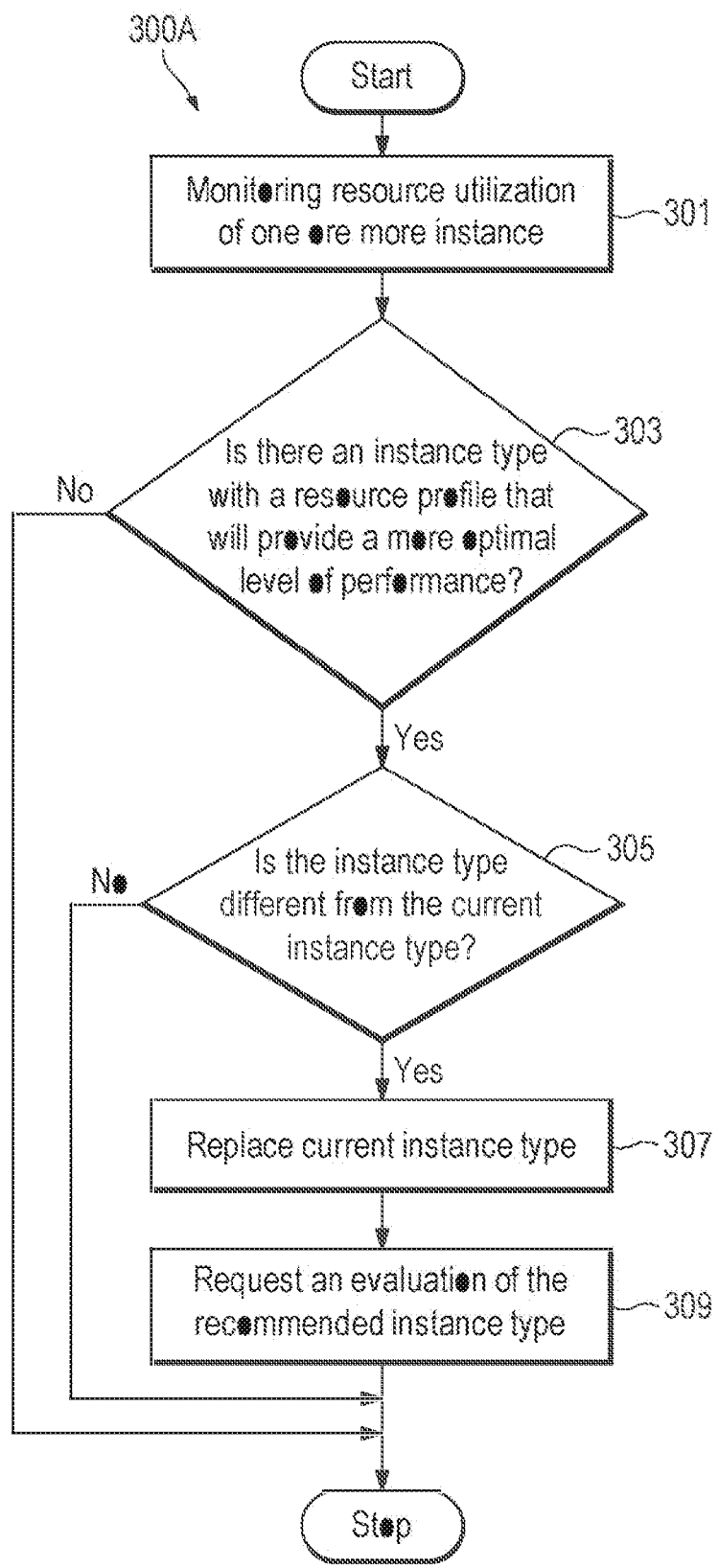
FIG. 3A is a flowchart of a method for automatically identifying and rightsizing instances according to an embodiment.

FIG. 3A is a flowchart of a method for automatically identifying and rightsizing instances according to an embodiment. The method includes, at 301 monitoring a resource utilization of a set of resources of one or more instances, the resource utilization corresponding to a first level of performance and cost. At 303, based on the resource utilization, determining if there is an instance type with a resource profile, for at least one of the one or more instances that will provide a second level of performance and cost that is closer to a default or optimal level of performance and cost than the first level of performance and cost. If there is an instance type with a resource profile, for at least one of the one or more instances that will provide a second level of performance and cost, that is closer to a default or optimal level of performance and cost than the first level of performance and cost, the process proceeds to 305. If there is not an instance type with a resource profile, for at least one of the one or more instances that will provide a second level of performance and cost, that is closer to a default or optimal level of performance and cost than the first level of performance and cost, the process proceeds to stop. At 305, based on the determining at 303, determining if the instance type is different from a current instance type of the at least one of the one or more instances. If the instance type is different from the current instance type of the at least one of the one or more instances the process proceeds to 307 where a recommendation is made to replace the current instance type with the more optimal instance type. If the instance type is not different from a current instance type of the at least one of the one or more instances the process proceeds to stop. At 311, an evaluation of the recommended instance type replacement is requested.

Figure 3B:
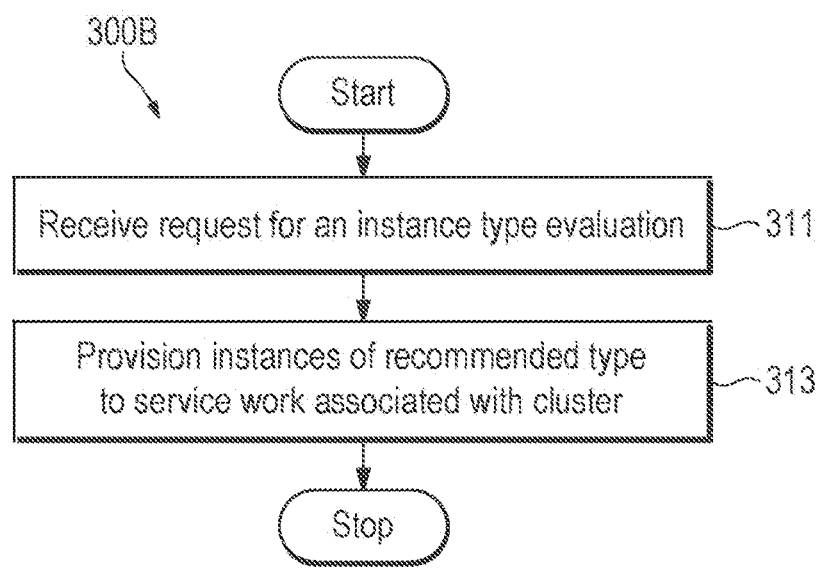
FIG. 3B is a flowchart of a method for evaluating instances according to an embodiment.

FIG. 3B is a flowchart of a method for performing an evaluation of a recommended instance type according to an embodiment. The method includes, at 309, receiving a request for an instance type evaluation. At 311, provisioning instances of the recommended type to service work associated with the application cluster.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2© by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood they have been presented by way of example only, and not limitation. Thus, the breadth and scope of the present application should not be limited by any of the implementations described herein, but should be defined only in accordance with the following and later-submitted claims and their equivalents.

What is claimed is:

1. A system to provide a compute optimization service for recommending compute resource usage, the system comprising:

memory circuitry to store program code of a resource analyzer, an instance type determiner, and an instance type recommender; and processor circuitry connected to the memory circuitry, wherein:

the processor circuitry is to operate the resource analyzer to analyze resource utilization metrics of a set of resources belonging to a set of instances, the resource utilization metrics corresponding to a first level of performance or cost;

the processor circuitry is to operate the instance type determiner to determine, based on the resource utilization metrics, a recommended instance type of the set of instances that is predicted to provide at least a second cost that is defined as more optimal by a user; and the processor circuitry is to operate the instance type recommender to:

cause evaluation of the at least one instance having the recommended instance type when the recommended instance type is different from a current instance type of the at least one instance, and provide, based on the evaluation, a recommendation to facilitate a replacement or resizing of the at least one instance having the current instance type with the at least one instance having the recommended instance type, wherein the processor circuitry is configured to cause evaluation by one or more machine learning (ML) models based on the resource utilization metrics to determine workload patterns of the at least one instance, wherein the one or more ML models further determine the recommendation based on a current workload data of the at least one instance, the determined workload patterns, and a range of desired performances and costs based on configured performance characteristics including utilization,
wherein, based on the recommendation, the at least one instance having the current instance type is replaced with or resized based on the at least one instance having the recommended instance type, and
wherein one or more workloads of the at least one instance are executed using the recommended instance type.

2. The system of claim 1, wherein the evaluation includes an evaluation of a performance or cost of the recommended instance type using workload data of the at least one instance.

3. The system of claim 1, wherein the recommendation includes one or more recommendations to reduce a cost of the current instance type or one or more recommendations to improve a performance of one or more workloads of the at least one instance.

4. The system of claim 1, wherein the processor circuitry is to operate the instance type determiner to operate the one or more ML models to determine the recommended instance type.

5. The system of claim 4, wherein the evaluation includes a comparison of the first level of performance or cost with the second level of performance or cost, and a decision to replace the at least one instance having the recommended instance type is made based on the comparing.

6. The system of claim 1, wherein the second level of performance or cost that is more optimal than the first level of performance or cost is identified from a specified range of performances or a specified range of costs.

7. The system of claim 1, wherein the second level of performance or cost that is more optimal than the first level of performance or cost is identified from a specified performance and a specified range of costs.

8. The system of claim 1, wherein the recommended resource type includes a resource profile, and the resource profile includes a specified amount of resources to be allocated to each resource with the recommended instance type.

9. A non-transitory computer-readable memory (NT-CRM) comprising instructions stored thereon that, in response to execution by a processor, are operable to cause the processor to:
analyze resource utilization metrics of a set of resources belonging to a set of instances, wherein the resource utilization metrics correspond to a first level of performance or cost;
determine, based on the analysis, a recommended instance type of the set of instances that is predicted to provide at least a second cost that is defined as more optimal by a user;
cause evaluation of the at least one instance with the recommended instance type when the recommended instance type is different from a current instance type of the at least one instance;
provide, based on the determination, a recommendation to facilitate a replacement or resizing of the current instance type of the at least one instances with the recommended instance type for the at least one instance;
based on the resource utilization metrics, cause evaluation by one or more machine learning (ML) models to determine workload patterns of the at least one instance;
determine, with the one or more ML models, the recommendation based on a current workload data of the at least one instance, the determined workload patterns, and a range of desired performances and costs based on configured performance characteristics including utilization;
replace, based on the recommendation, the at least one instance having the current instance type with or resized based on the at least one instance having the recommended instance type; and
execute one or more workloads of the at least one instance using the recommended instance type.

10. The NTCRM of claim 9, wherein the determination of the recommended resource type is based on outputs of the one or more ML models.

11. The NTCRM of claim 9, wherein:
the evaluation includes an evaluation of a performance or cost of the recommended instance type using workload data of the at least one instance; and
the recommendation includes one or more recommendations to reduce a cost of the current instance type or one or more recommendations to improve a performance of one or more workloads of the at least one instance.

12. The NTCRM of claim 9, wherein execution of the instructions is to cause the processor to compare the first level of performance or cost with the second level of performance or cost.

13. The NTCRM of claim 12, wherein a decision to replace the one or more instances is made based on the comparing.

14. The NTCRM of claim 9, wherein the second level of performance or cost that is more optimal than the first level of performance or cost is identified from a specified range of performances or a specified range of costs.

15. The NTCRM of claim 9, wherein the second level of performance or cost that more optimal than the first level of performance or cost is identified from a specified performances and a specified range of costs.

16. The NTCRM of claim 9, wherein the recommended resource type includes a resource profile, and the resource profile includes a specified amount of resources to be allocated for each resource having the recommended resource type.

17. A computer-implemented method for providing a compute optimization service for recommending compute resource usage, the method comprising:
analyzing resource utilization metrics of a set of resources belonging to a set of instances, wherein the resource utilization metrics correspond to a first level of performance or cost;
determining, based on the analyzing, a recommended instance type of the set of instances that is predicted to provide at least a second cost that is defined as more optimal by a user;
causing evaluation of the at least one instance having the recommended instance type when the recommended instance type is different from a current instance type of the at least one instance;
provide, based on the determining, a recommendation to facilitate a replacement or resizing of the at least one instance having the current instance type with the at least one instance having the recommended instance type;
based on the resource utilization metrics, cause evaluation by one or more machine learning (ML) models to determine workload patterns of the at least one instance;
determine, with the one or more ML models, the recommendation based on a current workload data of the at least one instance, the determined workload patterns, and a range of desired performances and costs based on configured performance characteristics including utilization;

replace or resize, based on the recommendation, the at least one instance having the current instance type based on the at least one instance having the recommended instance type; and execute one or more workloads of the at least one instance using the recommended instance type.

18. The method of claim 17, further comprising:
operating the one or more ML models to determine the recommended instance type.

19. The method of claim 17, wherein:
the evaluation includes an evaluation of a performance or cost of the recommended instance type using workload data of the at least one instance; and
the recommendation includes one or more recommendations to reduce a cost of the current instance type or one or more recommendations to improve a performance of one or more workloads of the at least one instance.

20. The method of claim 17, further comprising:
comparing the first level of performance and cost with the second level of performance or cost.

21. The method of claim 20, wherein a decision to replace the one or more instances is made based on the comparing.

22. The method of claim 17, wherein the second level of performance or cost that is more optimal than the first level of performance or cost is identified from a specified range of performances and the specified cost.

23. The method of claim 17, wherein the second level of performance or cost that is more optimal than the first level of performance or cost is identified from a specified performance and the specified range of costs.

24. The method of claim 17, wherein the recommended resource type includes a resource profile, and the resource profile includes a specified amount of resources that should be allocated for each resource of an instance having the recommended resource type.

* * * * *